United States Patent

[11] 3,613,894

[72] Inventor Kenneth K. Clegg, Jr.
Rte.1, Box 80, High Point, N.C. 27260
[21] Appl. No. 2,634
[22] Filed Jan. 13, 1970
[45] Patented Oct. 19, 1971

[54] SUBMERGED SUCTION STRAINER FOR A WATER HOSE
4 Claims, 13 Drawing Figs.

[52] U.S. Cl. .................................................. 210/456, 210/459
[51] Int. Cl. ....................................................... B01d 21/24
[50] Field of Search .......................................... 210/460, 461, 462, 463, 348, 455, 456, 459; 137/40; 285/274, 275

[56] References Cited
UNITED STATES PATENTS

| | | | |
|---|---|---|---|
| 2,300,952 | 11/1942 | May .............................. | 210/456 |
| 2,318,220 | 5/1943 | Haselwood .................... | 285/275 X |
| 2,331,332 | 10/1943 | Latta ............................ | 210/455 X |
| 3,495,714 | 2/1970 | Barton .......................... | 210/460 |

*Primary Examiner*—Reuben Friedman
*Assistant Examiner*—T. A. Granger
*Attorney*—Cushman, Darby & Cushman ABSTRACT: A suction strainer, preferably for use in a dump and go tank such as used in firefighting, which, during liquid withdrawal, rests continually on the bottom of the tank so as to eliminate whirlpool and suction loss and which, when in place, has its intake immediately adjacent the bottom of the tank so that water can be withdrawn to a very low level in the tank. In one embodiment, a unitary coupling member rests in a shallow tray on the bottom of the tank and liquid in the tank is pulled past the tray, into the member via a mesh screen which removes foreign objects, and out the coupling member to a conventional firefighting hose which is connected to the coupling at a preset angle. In another embodiment of the invention, the member coupled to the hose is pivotably mounted to a guide plate which rests on the shallow tray and is fixed with respect to it, so that any antiswirl plates in the strainer always remain in parallel with the tank bottom regardless of the angle at which the dump and go tank is set.

PATENTED OCT 19 1971 3,613,894
Fig. 1.
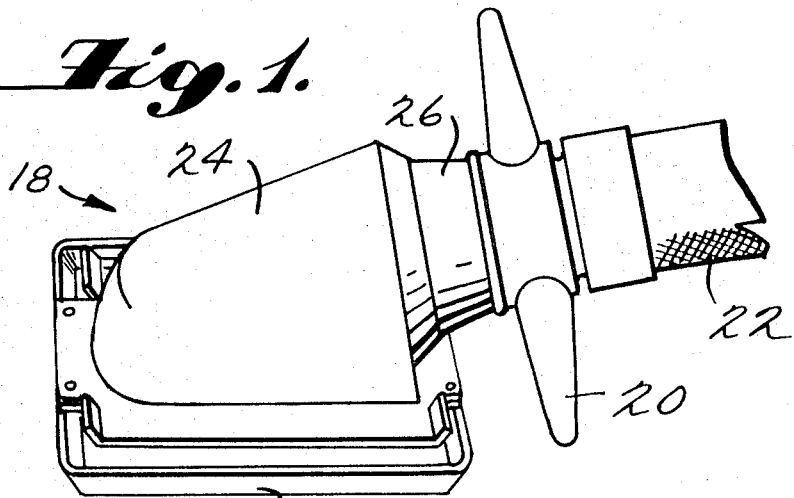
Fig. 2. 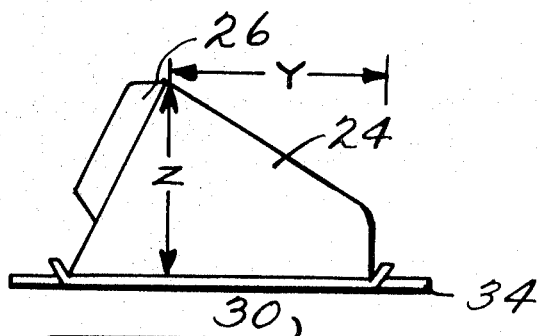 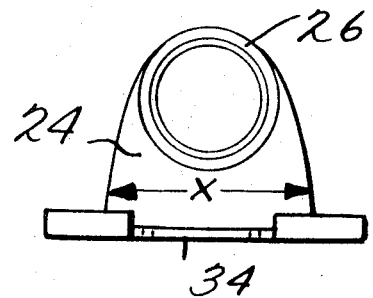 Fig. 3.
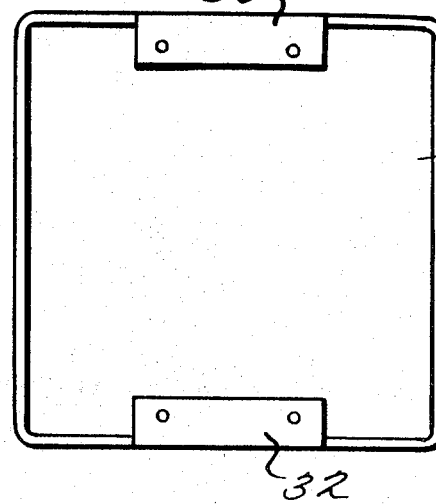 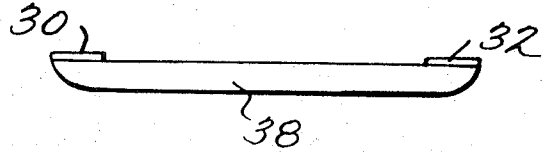
Fig. 5.
Fig. 4.
INVENTOR
KENNETH K. CLEGG, JR.
BY Cushman, Darby & Cushman
ATTORNEYS

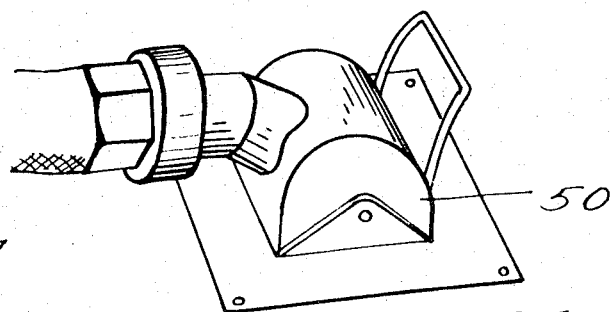
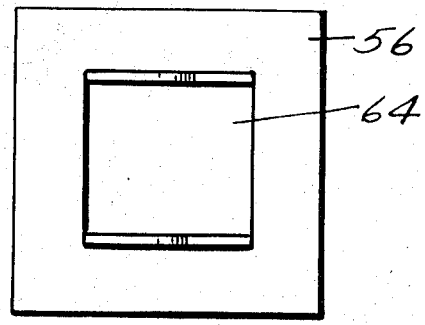
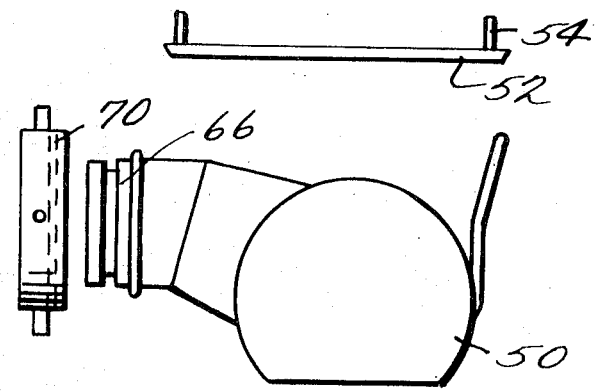
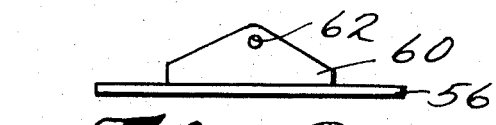
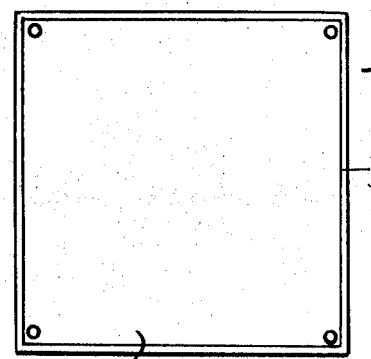
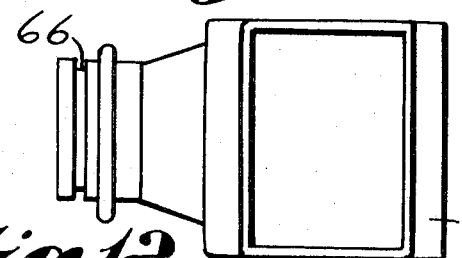
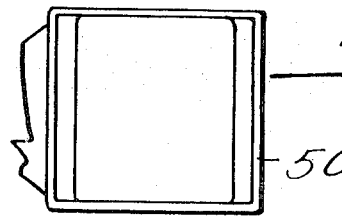

SUBMERGED SUCTION STRAINER FOR A WATER HOSE

BRIEF DESCRIPTION OF THE PRIOR ART AND SUMMARY OF THE INVENTION

The invention relates to a method and apparatus for removing firefighting liquid, such as water, from a tank such as a stop and go tank.

One firefighting technique which is increasingly relied upon, particularly in fighting rural fires, involves use of a stop and go tank. This tank is simply a portable container which is carried to the site of the fire, set up and then filled with firefighting liquid which then can be withdrawn through conventional hoses for extinguishing the fire. The tank thus serves in place of the water distribution system available in urban areas, and is periodically refilled by means of tank trucks which shuttle between the site of the fire and a convenient source of firefighting liquid, such as water, to keep the tank filled to the level necessary to maintain feed to the hoses spraying the liquid onto the fire.

Because the liquid which is used to replenish the dump and go tank frequently contains foreign objects which tend to clog the strainers and hoses and otherwise create problems, it is usually desirable to, at least some extent, strain the liquid before it is removed from the tank by a hose to be sprayed on the fire or otherwise employed in the firefighting operation. A round strainer, which is simply an elongated cylindrical member of plastic or other similar material with a plurality of small openings around its circumference, has been used in the past for this purpose. This type of strainer, however, is not totally satisfactory for withdrawing water from a tank in a stop and go operation, first, because it loses suction when the water level in the tank is reduced below about 14 inches, and second, because it does not always remain properly beneath the level of water in the tank, particularly when the tank is being refilled. This limitation on the level to which the water in the tank can be reduced is particularly important since, in a conventional 1,500-gallon tank, each inch of water represents about 50 gal. of liquid, and accordingly this type of round strainer cannot remove the final 700 gal. of water in the tank. Keeping the level in the tank above that point may prove difficult and may substantially hinder the firefighting effort.

Another type of strainer which has been used is commonly termed a float-dock strainer and is simply a float member with an apertured strainer attached thereto with the apertures below the surface of the water. While this type of arrangement is capable of continuing the pumping operation until the water level in the tank is reduced to about 6 inches, it too has severe disadvantages which render it less than completely satisfactory.

Obviously the most efficient way to use dump and go tanks is to refill them as quickly as possible, since the less time required to transfer the liquid load from the shuttle truck to the tank, the more water can be carried by that truck in any given length of time. Thus, currently preferred techniques emphasize rapid dumping into the tank and this procedure has been found to considerably improve firefighting ability. However, when water is entering the tank at a high rate such as is desirable with fast dump methods, for example, at the rate of 1,200 gallons per minute, floating strainers frequently ride too high in the water because of the whirlpool effect of the rapidly entering water with the result that suction to the hose is temporarily lost. Loss of suction means that the flow of water to the nozzle is interrupted with consequent danger to the firefighter and disruption of the firefighting effort.

The present invention relates to a strainer which is particularly suitable for use with a dump and go tank and which continually rides on the bottom of the tank. Further, the novel suction strainer of this invention includes a shallow tray on which a coupling member rests so that the water in the tank enters the coupling member via the shallow tray after passage through a mesh screen or similar straining filter. By this arrangement, not only is the danger of whirlpool and suction loss, which can result when water is being fast dumped into the tank, eliminated, but water can be withdrawn to a very low level in the stop and go tank, for example, 2 inches.

In another embodiment of the invention, the coupling member includes two portions, one resting on the tray and fixed with respect to it and the other pivotably mounted on the first portion along an axis parallel to the bottom of the tank and perpendicular to the direction which water is withdrawn so that the strainer is capable of being used on any tray regardless of whether it is level or not. Even further, this swivel-type coupling permits antiswirl plates to be installed parallel with the tank bottom if desired.

Many other objects and purposes of the invention will become clear from the following detailed description of the drawings.

A BRIEF DESCRIPTION OF THE DRAWINGS

FIG. 1 shows a perspective view of one embodiment of the invention with a hose coupled thereto for removing liquid from the bottom of a tank, such as a stop and go tank.

FIG. 2 shows a side view of the coupling member of the embodiment of FIG. 1.

FIG. 3 shows a front view of the coupling member of the embodiment of FIG. 1.

FIG. 4 shows a top view of the tray of the embodiment of FIG. 1.

FIG. 5 shows a side view of the tray of the embodiment of FIG. 1.

FIG. 6 shows a perspective view of another embodiment of the invention whereby the pickup body is hinged on an axis perpendicular to the line along which water is withdrawn by the hose.

FIG. 7 shows a top view of the stationary member of the embodiment of FIG. 6.

FIG. 8 shows a side view of the stationary member of the embodiment of FIG. 6.

FIG. 9 shows a top view of the tray of the embodiment of FIG. 6.

FIG. 10 shows a side view of the tray of the embodiment of FIG. 6.

FIG. 11 shows a side view of the pivoted coupling member of the embodiment of FIG. 6.

FIG. 12 FIG. 12 shows a top view of the pivoted coupling member of the embodiment of FIG. 6.

FIG. 13 shows a bottom view of the pivoted coupling member of the embodiment of FIG. 6.

DETAILED DESCRIPTION OF THE DRAWINGS

Reference is now made to FIGS. 1-5 which show one embodiment of the invention of this application. As discussed briefly above, novel strainer 18 illustrated in FIGS. 1-5 is designed to ride continuously on a tank bottom regardless of the rate of water flow in and out of the tank, to withdraw water from the tank unhampered by refilling of the tank regardless of the rate of refilling, and to retain suction even when water is discharged into the tank at a rate of over 1,200 gallons per minute. Further in this arrangement any antiswirl plate employed will be kept parallel with the tank bottom regardless of the terrain on which the tank rests.

As can be seen in FIG. 1, strainer 18 is connected by a conventional coupler 20 to a hose 22 which applies suction to withdraw water from the tank and deliver it to the site of the fire. As shown in FIGS. 2-5, strainer 18 is comprised of a coupling member 24 which is preferably formed as an integral member with an opening in the bottom for sucking up water from a tray 28, a hollow interior passage through which water passes and a tubular extension 26 for connection to csnventional coupler 20. The tubular extension 26 may be provided with exterior or interior threads. The hollow interior passage of member 24 is specifically designed so as to direct the flow of water as efficiently as possible from its entrance at the bottom of member 24 to extension 26 through which the water exits. Thus, in the embodiment of FIGS. 1-5 the portion of member 24 furtherest from extension 26 has a height less than the height of member 24 adjacent tubular extension 26. The humped shape of strainer 18 likewise contributes to the rapid rate at which water can be withdrawn frm the tank. In one embodiment of the invention constructed according to the arrangement shown in FIGS. 1–5, it was found that the flow rate at which water could be withdrawn from a conventional stop and go tank was up to twice the rate at which conventional pumps could conventionally withdraw liquid under similar conditions.

Referring to FIGS. 4 and 5, member 24 rests on a shallow tray 28 which is provided at its ends with two seats 30 and 32 upon which member 24 rests. Preferably, member 24 is bolted or otherwise fixed securely to shallow tray 28. As can be seen in FIG. 5, tray 28 is extremely shallow and, in one embodiment of the invention, the tray height, exclusive of the seats 30 and 32, was made to be 1 inch. It was found that, with this particular embodiment, water could be withdrawn down to a level of 2 inches in a relatively level stop and go tank.

A mesh screen 34 which is conventional in nature is preferably attached to the bottom of the member 26 to filter, at least in part, the water entering the opening in the bottom of member 24 around tray 28. In the embodiment of the invention which was constructed with a tray 28 having a 1-inch height, the dimensions T, U, X, Y and Z in FIGS. 2 and 3 were made to be 4 inches, 3 ½ inches, 7 inches, 10 inches and 15¼ inches respectively. These particular dimensions were found to be quite satisfactory.

Reference is now made to FIGS. 6–13 which show another embodiment of the invention similar to the arrangement of FIGS. 1–5. However, in this strainer, an additional stationary member is provided and the coupling member is adapted to pivot about an axis in this stationary member so that the angle that the hose is attached to the member with respect to the bottom of the stop and go tank and also with respect to the shallow tray 52 can be altered so that the unit can be easily employed in any location regardless of the angle at which the stop and go tank is set.

As in the embodiment of FIGs. 1–5, tray 52 shown in FIGS. 9 and 10 is quite shallow and is provided with a rim 54 around its interior of the order of about 2 inches in height. The stationary member 56 illustrated in FIGS. 7 and 8 is designed to set in tray 52 so as to provide a suitable clearance for water to be sucked up from tray 52 into pivotable coupling member 58. Member 50, as can be seen in FIG. 13, has an opening 64 in its bottom for receiving the water which is sucked into tray 52 and up through opening 64 to pivotable coupling member 50. Further, as can be seen in FIG. 8, stationary member 56 is pivotably connected to member 50 so that member 50 is pivotable about axis 62 which is parallel to the bottom of the tank and perpendicular to the direction water flows out extension member 66. The extending tubular member 66 of the coupling member 50 is provided with threads for engaging a coupler 70 which is shown at FIG. 11 and which connects tubular extension 66 to a suitable hose.

Many changes and modifications can be made in the embodiments of the invention illustrated in FIGS. 1–13, and the scope of this invention is intended to be limited only by the scope of the appended claims.

What is claimed is:
1. A suction strainer comprising:
  a shallow tray for resting on the bottom of a tank,
  a coupling member adapted to rest on said tray and having an opening in the bottom thereof adjacent said tray for withdrawing fluid from said tank so that said fluid can be withdrawn to a low level, means for coupling said member to a hose so that said hose receives said fluid from said member, and an interior passage for directing said fluid from said opening to said coupling means, and
  a stationary member pivotable connected to said coupling member so that said coupling member is pivotable about an axis substantially parallel with the bottom of said tank and substantially perpendicular to the direction which said fluid flows into said hose from said coupling means.
2. A strainer as in claim 1 further including a mesh screen covering said opening for filtering said fluid.
3. A strainer as in claim 1 wherein said coupling means is at one end of said coupling member, the height of said coupling member is greatest adjacent said coupling means and decreases continuously toward the other end of said coupling member.
4. A strainer as in claim 1 wherein said coupling means is a threaded tubular extension of said coupling member.